J. C. MOORE.
FLUID MEASURING DEVICE.
APPLICATION FILED APR. 26, 1920.
1,358,771.
Patented Nov. 16, 1920.
2 SHEETS—SHEET 2.
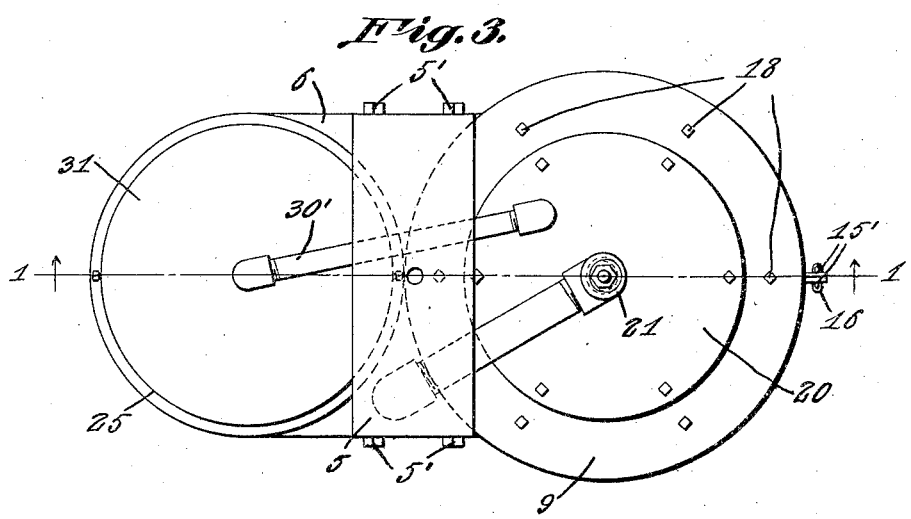
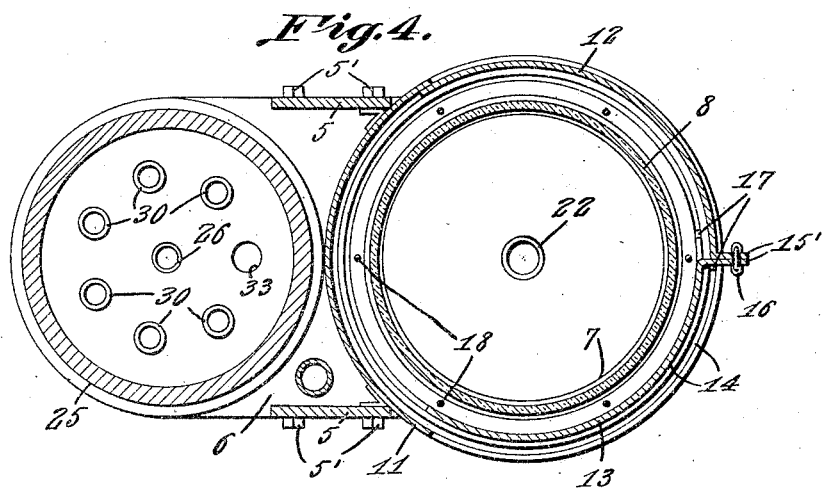
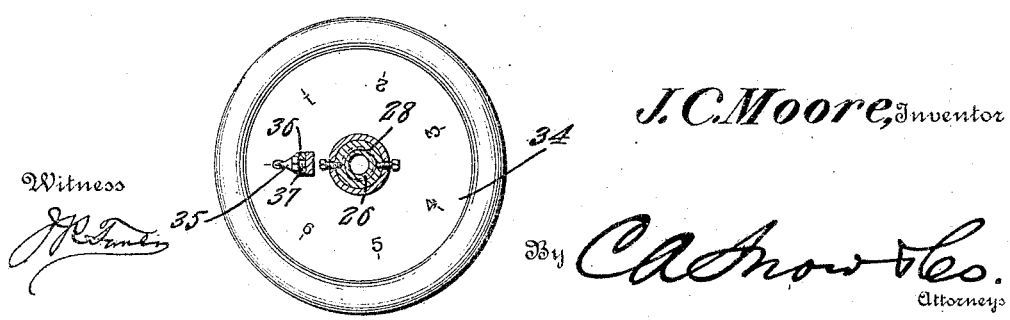
J. C. Moore, Inventor

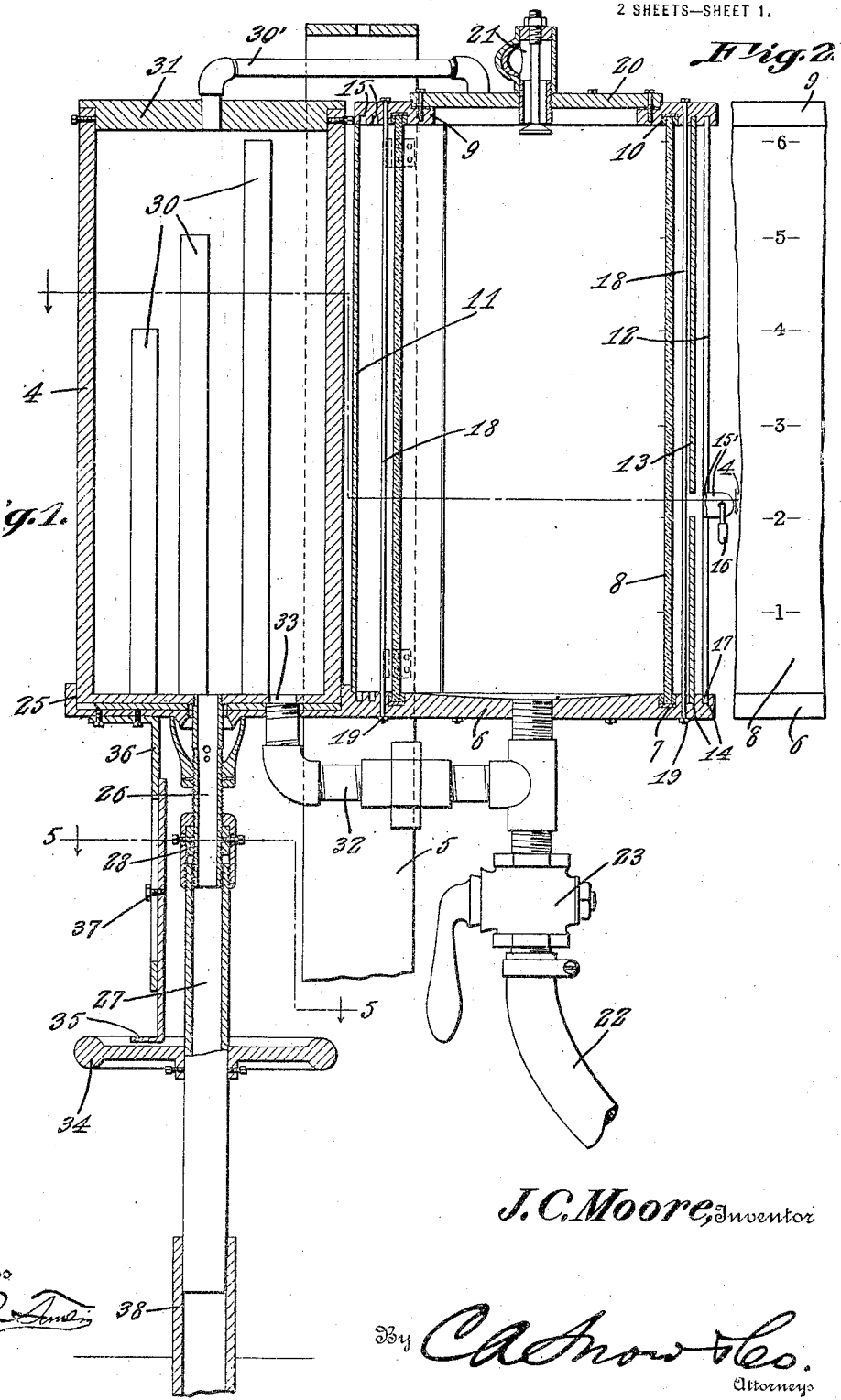

UNITED STATES PATENT OFFICE.

JULIUS C. MOORE, OF RALEIGH, NORTH CAROLINA.

FLUID-MEASURING DEVICE.

1,358,771.  Specification of Letters Patent.  Patented Nov. 16, 1920.

Application filed April 26, 1920. Serial No. 376,639.

*To all whom it may concern:*

Be it known that I, JULIUS C. MOORE, a citizen of the United States, residing at Raleigh, in the county of Wake and State of North Carolina, have invented a new and useful Fluid-Measuring Device, of which the following is a specification.

This invention relates to dispensing devices, and more particularly to devices especially designed for measuring and dispensing gasolene or the like.

The primary object of the invention is to provide means of this character operating on the overflow principle, whereby certain mechanism may be set to cause the incoming fluid to overflow and be returned to the main tank, when the same has attained a predetermined level within the measuring tank, thus insuring the exact quantity of fluid being dispensed.

A further object of the invention is to provide a novel form of measuring tank adapted to be rotated in a horizontal plane, and one in which the connections between the cylinder and the support will be sealed by the weight of the tank, thus eliminating the use of a gasket or the like.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawings:—

Figure 1 illustrates a longitudinal sectional view taken on line 1—1 of Fig. 3.

Fig. 2 illustrates a fragmental detail view of the casing of the visible tank, disclosing the graduations thereon.

Fig. 3 illustrates a plan view of the device.

Fig. 4 illustrates a sectional view taken on line 4—4 of Fig. 1, and

Fig. 5 illustrates a sectional view taken on line 5—5 of Fig. 1.

Referring to the drawings in detail, the reference character 5 designates the supporting stand which supports the base 6 of the dispensing device, the base 6 being secured to the supporting stand 5 as at 5'.

This base 6 is provided with a circular groove 7 to receive the cylindrical tank 8, formed of glass or other transparent material to permit the contents of the tank to be viewed through the side walls of the casing, there being graduations formed on the glass to enable the person purchasing the fluid to determine the amount of fluid he is receiving.

A circular plate 9 forms the upper end of the tank, and this plate is also provided with a circular groove 10 to accommodate the upper extremity of the tank 8, there being positioned within the grooves 7 and 10, suitable packing means to insure a water and air-tight connection between the base and upper end, and the tank 8.

The tank 8, is partially inclosed by the metallic casing 11, which is curved to conform to the curvature of the cylindrical tank 8, the same being however, disposed in spaced relation with the tank to provide a clearance for the movable sections 12 and 13, which coöperate with the casing 11 to house the cylindrical tank 8 and prevent theft of the fluid, by breaking the glass, forming the walls of the tank 8.

As shown, the movable sections 12 and 13 have their ends positioned within the grooves 14, and 15 respectively, to permit the same to be moved to positions between the rear wall of the tank 8, and the casing 11, when it is desired to open the device to operate the same. Formed on each of the sections 12 and 13, is an apertured ear 15, the apertures thereof registering to accommodate a suitable lock indicated at 16, to lock the sections together, there being stops 17 provided in the grooves 14, to prevent the sections 12 and 13 from being rotated or moved, when the same are in their locked positions.

Connecting the base 6, and the circular plate 9, are the rods 18, which extend through suitable openings in the plate 9 and base 6, there being nuts 19 provided on the lower ends of the rods for securing these rods in position. The circular plate 9 is provided with an opening which is closed by the disk 20 supporting the nozzle, through which the fluid passes on its entrance 21, which controls the passage of fluid to the tank 8. The discharge of fluid from tank 8 is accomplished through the pipe 22, which carries a suitable filling nozzle on the free end thereof, the passage of fluid through the pipe 22 being controlled by means of the valve 23 forming a part of the pipe 22.

Associated with the tank 8 is a measuring tank 24 which is in the form of a metallic cylinder, the lower end of which being positioned in the recessed portion 25 of the base 6, to permit the measuring tank to move with relation to the base 5 for purposes to be hereinafter more fully described.

This measuring tank 24 is provided with a central opening formed in the lower end thereof, the discharge pipe 26, which is shown as having one end positioned within the opening, provides the discharge for the tank 24 to permit the fluid to be returned to the main tank, not shown, through the pipes 27 and 38. A collar 28 provides means for connecting the pipes 26 and 27, the collar being of a construction to support packing material to insure a water and air-tight connection between the pipes 26 and 27, to permit the pipe 26 to automatically adjust itself with relation to pipe 27, thus insuring a proper seating of the tank 24 on the base 6.

Formed in the lower end of the measuring tank 24, are a plurality of openings disposed in suitable spaced relation with each other, and these openings receive one of the ends of the pipes indicated at 30, which extend upwardly from the lower end of the tank 24, the upper end of the pipes terminating in spaced relation with the upper end 31 of the tank 24, the lengths of the pipes 30 varying to permit the tank 24 to return fluid to the main tank, when the fluid in the tank 8 has attained predetermined levels.

A pipe 32 has one of its ends in communication with the tank 24, the opposite end thereof having communication with the tank 8 through the pipe 22, to which one end of the pipe 22 is connected, and as shown, one end of the pipe 32 is disposed in a position whereby any one of the pipes 30 may be brought into communication therewith or, if it is desirable to cause the fluid to flow directly from the tank 8 and discharge through the pipe 26, the opening 33, formed in the lower end of the tank 24 may be brought into communication with the pipe 22, whereupon the fluid from tank 8 has an unobstructed passage through the return pipe 26, to drain the tank 8.

Connected to the pipe 27, to move therewith, is a controlling wheel 34, which has suitable indicating characters thereon, as disclosed by Fig. 5 of the drawings, which indicating characters coöperate with an indicating member 35 adjustably connected to the bases by means of the bracket member 36, depending therefrom, the bracket member being provided with the slotted portion adapted to accommodate the screw 37, whereby the indicating member 35 may be secured in its positions of adjustment, to permit the indicating member 35 to operate when the controlling wheel 34 is adjusted longitudinally of the pipe 27, which adjustment is made at the will of the operator to facilitate the operation of the device.

A vent pipe 30' has communication with the respective tanks, through the upper ends thereof so that the air in the tanks which is displaced by the incoming gasolene, may be carried off.

The pipe 27 is permitted to move in the upper end of the pipe 38, whereby the tank 24 may be rotated to bring predetermined pipes 30 into registry with the pipe 36.

It will of course be understood that the lengths of the pipes 30 vary, so that they will overflow when the quantity of fluid in the tank 8 reaches a predetermined level, or when the fluid in tank 8 reaches, for example the five gallon mark, the pipe 30 which terminates at a point in the same plane with the five gallon mark on the tank 8, and which has been moved in communication with the pipe 32, overflows, to return the surplus fluid to the main tank.

In the operation of the device, the tank 24 is first rotated to bring a predetermined pipe 30 into registry with the pipe 32, whereupon fluid is pumped into the tank 8 through pipe 22 by any suitable pumping means not shown.

It follows that as the fluid enters the tank 8, the fluid assumes a level in the pipe 30 which is in communication with the pipe 32, equal to the level of the fluid in the tank 8. When the fluid has reached the upper end of the pipe 30, the same overflows and is carried off to the main or supply tank not shown, through the drain pipes 27 and 38.

The valve 23 is now operated to permit the gasolene to flow through the pipe 22.

Having thus described the invention, what is claimed as new is:—

1. In a liquid dispensing device, a base, a pair of tanks supported by the base, means for providing communication between the tanks, one of said tanks having a plurality of pipes of various lengths supported therein, said tank being rotatable to permit any one of the pipes to be moved into communication with the opposite tank, and a drain pipe in communication with the rotatable tank, and means for rotating the rotatable tank.

2. In a liquid dispensing device, a base, a stationary tank supported by the base, a movable tank supported by the base, means for providing communication between the tanks, a plurality of pipes of various lengths supported within the movable tank, means for moving the latter tank to bring the pipes into communication with the stationary tank, means for supplying fluid to the stationary tank, and a discharge pipe for returning fluid from the movable tank.

3. In a liquid dispensing device, a base, a main tank of transparent material supported on the base, a measuring tank in communication with the main tank, a plurality of pipes of various lengths disposed in the measuring tank, a feed pipe providing communication between the tanks, means for moving the measuring tank to bring a predetermined pipe into communication with the feed pipe, and a discharge pipe for carrying off the surplus fluid.

In testimony that I claim the foregoing as my own, I have hereto affixed my signature in the presence of two witnesses.

JULIUS C. MOORE.

Witnesses:
 IVY E. SIMPSON,
 AGNES ROCKELLI